US008854247B2

(12) United States Patent
Etebari et al.

(10) Patent No.: US 8,854,247 B2
(45) Date of Patent: Oct. 7, 2014

(54) METAL DETECTOR AND GROUND-PENETRATING RADAR HYBRID HEAD AND MANUFACTURING METHOD THEREOF

(75) Inventors: Ali Etebari, Ashburn, VA (US); Jason Wolfson, Chantilly, VA (US); Brian A. Whaley, Vienna, VA (US); Mark Hibbard, Arlington, VA (US)

(73) Assignee: NIITEK, Inc., Dulles, VA (US)

( * ) Notice: Subject to any disclaimer, the term of this patent is extended or adjusted under 35 U.S.C. 154(b) by 492 days.

(21) Appl. No.: 13/207,475

(22) Filed: Aug. 11, 2011

(65) Prior Publication Data

US 2012/0092206 A1 Apr. 19, 2012

Related U.S. Application Data

(60) Provisional application No. 61/375,624, filed on Aug. 20, 2010.

(51) Int. Cl.
*G01S 13/00* (2006.01)
*G01V 3/00* (2006.01)
*G01V 3/08* (2006.01)
*G01V 3/12* (2006.01)
*G01S 13/88* (2006.01)

(52) U.S. Cl.
CPC *G01V 3/12* (2013.01); *G01S 13/885* (2013.01)
USPC ............. 342/22; 342/52; 324/323; 324/326; 324/332; 324/344

(58) Field of Classification Search
CPC ..... G01S 13/885; G01S 13/90; G01S 5/0257; G01S 13/04; G01S 13/9035; G01S 17/89; G01S 13/86; G01S 2007/027; G01S 13/06; G01S 13/887; G01S 13/888; G01S 13/89; G01S 15/89; G01S 7/411; G01V 3/12
USPC ............. 342/22, 52; 324/323, 326–329, 332, 324/334–337, 344
See application file for complete search history.

(56) References Cited

U.S. PATENT DOCUMENTS 5,680,048 A * 10/1997 Wollny .......................... 324/329
6,026,135 A *  2/2000 McFee et al. ................. 376/159
(Continued)

FOREIGN PATENT DOCUMENTS

EP          1 750 147 A1    2/2007

OTHER PUBLICATIONS

S.-H. Lee et al. "Beamforming Array for Detecting Buried Land Mines," SPIE Conference on Detection and Remediation Technologies for Mines and Minelike Targets IV (Apr. 1999), SPIE vol. 3710, pp. 1343-1351 (9 pages total).

(Continued)

*Primary Examiner* — Peter Bythrow
(74) *Attorney, Agent, or Firm* — Finnegan, Henderson, Farabow, Garrett & Dunner, LLP

(57) ABSTRACT

A hybrid ground penetrating radar (GPR)/metal detector (MD) head includes a V-dipole GPR antenna and transmit and receive MD coils. One of the MD coils is arranged in a quadrupole configuration with a crossbar, and the V-dipole antenna is perpendicular to the crossbar. The legs of the V-dipole antenna may straddle the crossbar or may be on one side of the crossbar. The MD coils may be fabricated on a printed circuit board, which may be at a non-normal angle with respect to a central axis of the V-dipole antenna.

18 Claims, 14 Drawing Sheets

(56) References Cited

U.S. PATENT DOCUMENTS

| | | | |
|---|---|---|---|
| 6,333,631 B1 * | 12/2001 | Das et al. | 324/326 |
| 6,341,551 B1 * | 1/2002 | Comeyne | 89/1.13 |
| 6,343,534 B1 * | 2/2002 | Khanna et al. | 89/1.13 |
| 6,377,872 B1 * | 4/2002 | Struckman | 700/258 |
| 6,541,966 B1 * | 4/2003 | Keene | 324/243 |
| 6,950,054 B1 * | 9/2005 | Steinway et al. | 342/22 |
| 6,999,021 B2 * | 2/2006 | Taylor et al. | 342/22 |
| 7,042,385 B1 * | 5/2006 | Wichmann | 342/22 |
| 7,202,661 B2 | 4/2007 | Keene et al. | |
| 7,310,060 B2 * | 12/2007 | Stilwell et al. | 342/22 |
| 7,333,045 B1 * | 2/2008 | Aomori et al. | 342/22 |
| 7,532,127 B2 * | 5/2009 | Holman et al. | 340/686.1 |
| 7,692,598 B1 * | 4/2010 | Hibbard et al. | 343/795 |
| 7,834,801 B2 * | 11/2010 | Waite et al. | 342/22 |
| 7,956,794 B2 * | 6/2011 | Skultety-Betz et al. | 342/22 |
| 8,174,429 B2 * | 5/2012 | Steinway et al. | 342/22 |
| 8,310,236 B2 * | 11/2012 | Duvoisin, III | 324/326 |
| 2003/0193429 A1 * | 10/2003 | Campana et al. | 342/22 |
| 2006/0284758 A1 * | 12/2006 | Stilwell et al. | 342/22 |
| 2007/0260378 A1 * | 11/2007 | Clodfelter | 701/48 |
| 2008/0092364 A1 * | 4/2008 | Wichmann | 29/600 |
| 2010/0277358 A1 * | 11/2010 | Duvoisin et al. | 342/22 |
| 2010/0277397 A1 * | 11/2010 | Scott | 343/904 |
| 2013/0113648 A1 * | 5/2013 | Duvoisin et al. | 342/22 |

OTHER PUBLICATIONS

Kim et al. "The Design and Realization of a Discreetly Loaded Resistive Vee Dipole on a Printed Circuit Board", Proceedings of SPIE, vol. 5089 (Apr. 2003), pp. 818-829 (12 pages total).

W.R. Scott, Jr. et al. "Combined Seismic, Radar, and Induction Sensor for Landmine Detection," Geoscience and Remote Sensing Symposium, 2004. IGARSS '04. Proceedings, pp. 1613-1616 (4 pages total).

W.R. Scott, Jr., "New Cancellation Technique for Electromagnetic Induction Sensors," Detection and Remediation Technologies for Mines and Minelike Targets X, ed. R.S. Harmon et al., Proc. SPIE vol. 5794 (2005), pp. 328-335 (8 pages total).

W.R. Scott, Jr. "Broadband Electromagnetic Induction Sensor for Detecting Buried Landmines," Geoscience and Remote Sensing Symposium, 2007. IGARSS 2007, pp. 22-25 (4 pages total).

E.B. Fails et al. "Performance Comparison of Frequency Domain Quadrupole and Dipole Electromagnetic Induction Sensors in a Landmine Detection Application," Detection and Sensing of Mines, Explosive Objects, and Obscured Targets XII, ed. R.S. Harmon et al., Proc. SPIE vol. 6953 (2008), pp. 695304-1-694304-11 (11 pages total).

W.R. Scott, Jr. et al. "Broadband Array of Electromagnetic Induction Sensors for Detecting Buried Landmines," Geoscience and Remote Sensing Symposium, 2008. IGARSS 2008, pp. II-375-II-378 (4 pages total).

A.C. Gurbuz et al. "Location Estimation Using a Broadband Electromagnetic Induction Array," Detection and Sensing of Mines, Explosive Objects, and Obscured Targets XIV, ed. R.S. Harmon et al., Proc. SPIE vol. 7303 (2009), pp. 73030U-1-73030U-9 (9 pages total).

International Search Report and Written Opinion for related International Appl. PCT/US2011/047316, mailing date Feb. 24, 2012 (11 pages total).

* cited by examiner

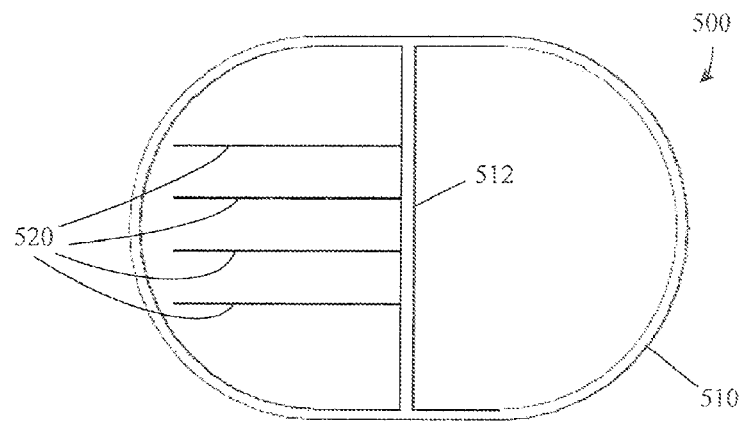
FIG. 5A
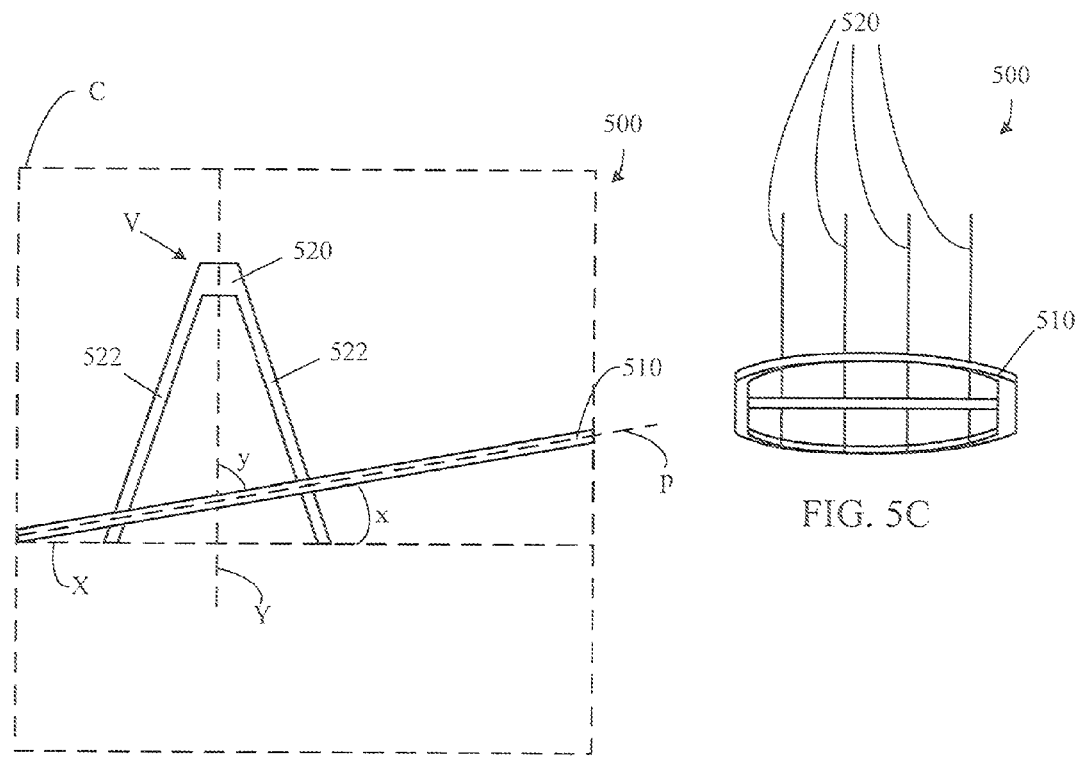
FIG. 5C
FIG. 5B

METAL DETECTOR AND GROUND-PENETRATING RADAR HYBRID HEAD AND MANUFACTURING METHOD THEREOF

CROSS-REFERENCE TO RELATED APPLICATIONS

This application is based on and derives the benefit of the filing date of U.S. patent application Ser. No. 61/375,624, filed Aug. 20, 2010. The entire content of this application is herein incorporated by reference in its entirety.

FIELD

The present disclosure is directed to the field of mine and metal detection and, more particularly, towards systems and methods for integrating a ground penetrating radar head with a metal detector head.

BRIEF DESCRIPTION OF THE FIGURES

FIG. 5A-5C are top view, front view, and side view schematic representations of an integrated ground penetrating radar head according to an alternate disclosed embodiment.

DESCRIPTION OF EMBODIMENTS OF THE INVENTION

Figure 1:
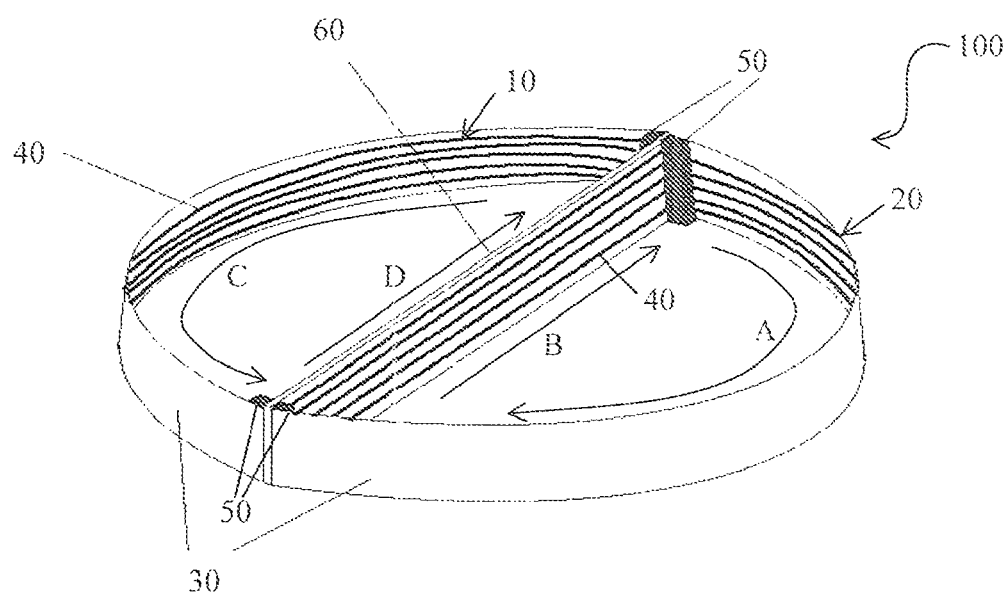
FIG. 1 is a schematic representation of the transmit and receive coils of an electromagnetic induction metal detector head according to a disclosed embodiment.

A need has arisen for a hand held sensor that can detect underground objects, including but not limited to underground objects such as land mines. The sensor must be unintrusive because of the nature of certain underground objects such as land mines. The combination of ground penetrating radar ("GPR") and metal detection ("MD", also referred to herein as electromagnetic induction, "EMI", sensing) is desirable because of the different material characteristics that they detect. A GPR system can measure the difference between dielectric constants of materials and their relative positions, while the MD measures the nearby presence or absence of conductive materials, with some information about the size and shape.

Integrating the MD sensor coils and the GPR antenna into a single, hybrid head can cause problems because both the transmit and receive coils of the EMI sensor and the antenna of the GPR produce and/or sense electro-magnetic fields that may be affected by the proximity of the other, thereby affecting the operation of MD, the GPR, or both. For example, coupling of the MD coils to the GPR signal may result in ringing (clutter) in the GPR system, which may lower sensitivity and degrade performance. Accordingly, it is desirable to reduce coupling (resonance) between EMI sensor coils and GPR antennas. This can be achieved through both positioning of the coils and antennas relative to each other and through the choice of materials used to fabricate the antennas and coils in the hybrid head.

At a high level, this disclosure is directed to a GPR and MD hybrid head. In some embodiments, the hybrid head includes at least one GPR antenna, an MD transmit coil, and a MD receive coil that is arranged in a quadrupole configuration including a crossbar to minimize coupling between the transmit and receive coils, similar to common mode rejection. The at least one GPR antenna is a planar antenna, such as a V-dipole, that is positioned in a plane perpendicular to the crossbar of the quadrupole receive coil of the MD coils so as to reduce coupling between the GPR antenna and the MD coils. In some embodiments, in order to further reduce coupling between the GPR antenna and the MD transmit and receive coils, the plane in which the MD transmit and receive coils is located is positioned at a non-normal angle between 20 and 90 degrees, and more particularly between 45 and 90 degrees, such as 70 degrees, with respect to a central axis of the GPR planar antenna.

The details of the design and implementation of an MD sensor in a quadrupole configuration are discussed in at least the following papers, all of which are hereby incorporated by reference in their entirety in this application: "Broadband Electromagnetic Induction Sensor for Detecting Buried Landmine," Waymond R. Scott, Jr.; "New Cancellation Technique for Electromagnetic Induction Sensors," Waymond R. Scott, Jr.; and Michael Malluck; "Broadband Array of Electromagnetic Induction Sensors for Detecting Buried Landmines," Waymond R. Scott, Jr.; "Location Estimation Using A Broadband Electromagnetic Induction Array," Ali C. Gurbuz, Waymond R. Scott, Jr., and James H. McClellan; "Beamforming Array for Detecting Buried Land Mines," Seung-Ho Lee and Waymond R. Scott, Jr.; "Combined Seismic, Radar, and Induction Sensor for Landmine Detection," Waymond R. Scott, Jr.; Kangwook Kim, Gregg D. Larson, Ali C. Gurbuz, and James H. McClellan; and "Performance Comparison of Frequency Domain Quadrupole and Dipole Electromagnetic Induction Sensors in a Landmine Detection Application," Eric B. Fails, Peter A. Torrione, Waymond R. Scott, Jr., and Leslie M. Collins.

In addition to the MD sensor arranged in a quadrupole configuration, the hybrid head also includes a V-dipole antenna of a GPR collocated with the MD sensor. The details of the design and implementation of a V-dipole antenna for a GPR are provided in the papers cited above. Details concerning the design and implementation of V-dipole antennas are also disclosed in Kim et al., "The Design and Realization of a Discreetly Loaded Resistive Vee Dipole on a Printed Circuit Board", 2003, pp. 818-829; Vol. 5089, Proceedings of SPIE, which is also incorporated by reference in its entirety in this application.

While the configuration discussed above may reduce most of the coupling between the MD sensor and the GPR antenna, there may be some coupling due to components of the MD coils that may be oriented parallel to the to the V-dipoles. This coupling may be reduced by pitching the MD sensor coils at a non-normal angle with respect to the plane of the GPR antenna as discussed above.

Furthermore, in an embodiment the top and bottom portion of the transmit and receive coils of the MD sensor may be covered by an electrostatic shield. The electrostatic shield fixes the capacitance of the coil to a changing outside environment.

A particular embodiment of an MD/GPR hybrid head will now be discussed with reference to FIGS. 1 and 2. FIG. 1 illustrates a low radar cross section transmit/receive coil assembly 100. The coil assembly 100 is formed from two D-shaped halves 10, 20. Each of the halves 10, 20 is formed from a substrate 30 on which a plurality of traces 40 are formed. The substrate 30 may be formed from a flexible material such as a polyester or polyimide. The traces 40 may be formed of conducting, metallic material such as copper using any known technique, such as chemical etching. Connectors 50 connect the traces on the two halves 10, 20 such that the current in the receive coil flows in a figure eight pattern through multiple turns of the coil assembly 100, with current flowing through all of the traces 40 on the crossbar 60 in the same direction (referred to in the art as a quadruple configuration). For example, in one embodiment, the connectors 50 connect the traces 40 such that current flows in the direction of the sequence of arrows A-B-C-D through one turn of the coil assembly 100. The transmit coil extends around the outer circumference of both halves 10, 20 on the outside or inside of substrates 30. The substrates 30 and the traces 40 are as thin as possible consistent with structural and electrical requirements in order to minimize the radar cross section of the coil assembly 100. Alternatively, the transmit coil may be formed in a simple circular pattern on a separate substrate surrounding the receive coil such that the receive coil is concentric with the transmit coil.

Figure 2:
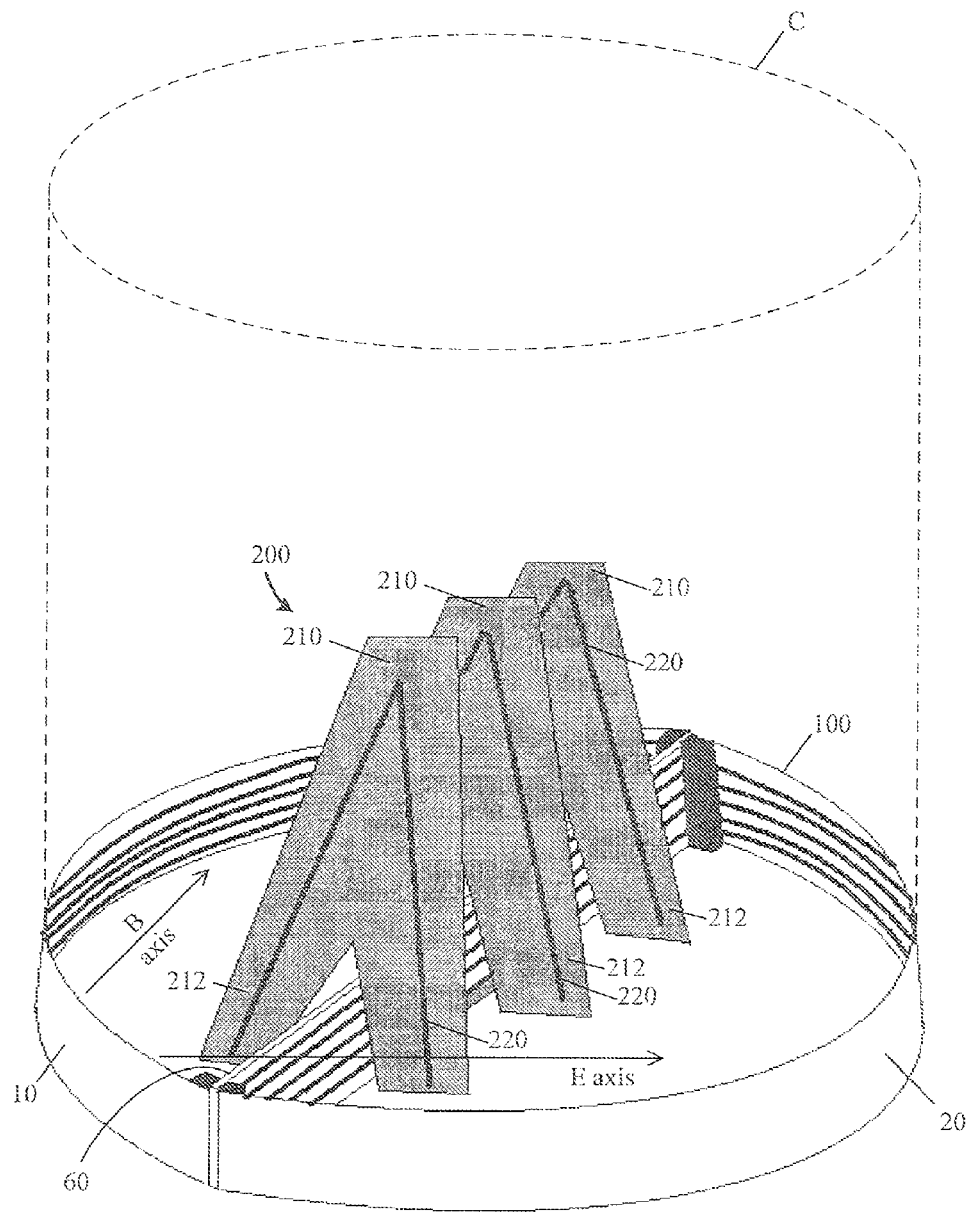
FIG. 2 is a schematic representation of an integrated ground penetrating radar head according to a disclosed embodiment.

Referring now to FIG. 2, a GPR antenna array 200 including a plurality of elements 210 is shown (3 elements are shown in FIG. 2, but those of skill in the art will recognize that more or less elements may be used). The elements 210 are each planar and in the shape of an inverted V-dipole, with the open end of the V-dipole positioned over the crossbar 60 of the coil assembly 100. In this manner, the components of the coil assembly 100 that are along the B-field axis (i.e., the crossbar 60) do not couple to the V-dipoles 210 which define the E-field axis. The elements 210 may be formed on a planar substrate 212 with a metallic trace 220 formed thereon. In FIG. 2, the distal ends (the ends at the open end of the V) of the V-dipole elements 210 are positioned such that the crossbar 60 is interposed between them. In other embodiments, the V-dipole elements 210 are positioned such that no portion of the crossbar 60 is interposed between any portion of the two legs of the V-dipole elements 210, but the distal ends of the V-dipole elements are on opposite sides of the plane in which crossbar 60 is oriented. In such configurations, the V-dipole elements are within an imaginary cylinder C (as used herein, "cylinder" is not limited to circular cylinders but rather includes any surface generated by a straight line intersecting and moving along a closed plane curve while remaining parallel to a fixed straight line that is perpendicular to the closed plane curve) with a base formed by the projection of the cross sectional shape of the coil assembly 100 onto the plane which is perpendicular to the planes in which the crossbar 60 and the V-dipole elements 210 are oriented.

A second embodiment of an MD/GPR hybrid head 300 will now be discussed with reference to FIGS. 3A-D and 5A-C. The receive and transmit coils of the hybrid head 300 are formed by a multilayer PCB (printed circuit board) with through-hole vias for inter-layer connections. Each layer of the multi-layer PCB board includes either four grounding (shielding) fingers or two turns each of both the transmit and receive coils. The transmit and receive coils are approximately concentric (as used herein, approximately concentric means that the approximate centers of the receive and transmit coils are both approximately on an axis of concentricity that is normal to the faces of the coils, and one coil is located within an outer perimeter, formed by the turns of the other coil). Also, as above, the receive coil is in a quadrupole configuration. The total numbers of layers included in the PCB board depends upon the number of turns desired.

Figure 3A:
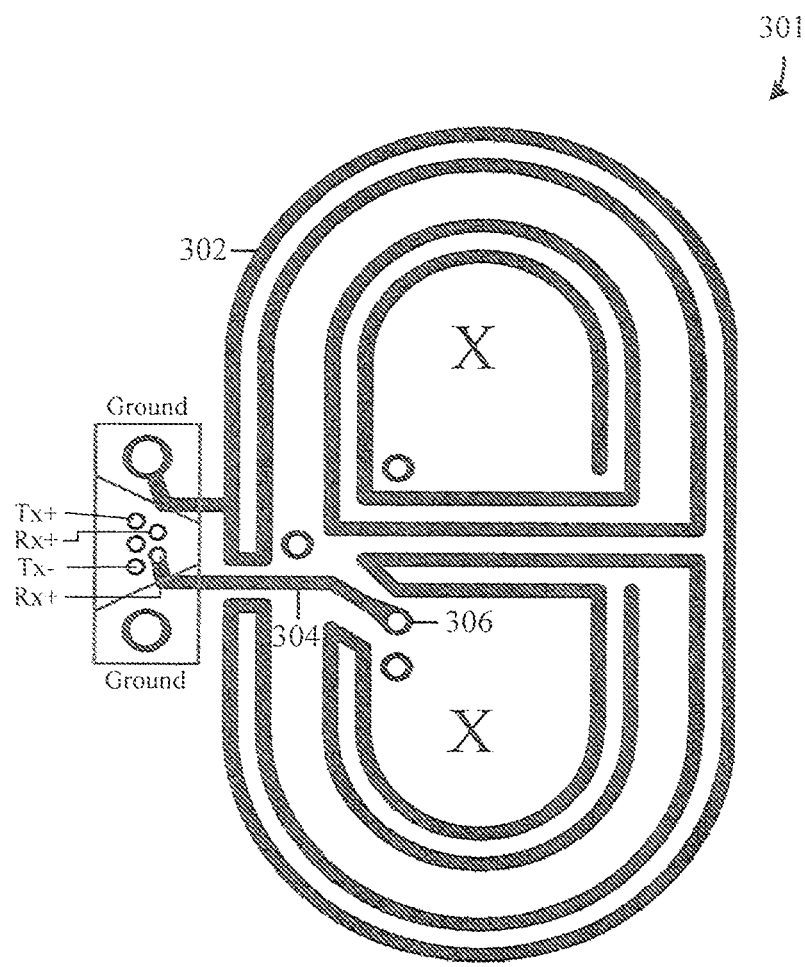
FIGS. 3A-3D are schematic representations of layers in a multi-layer printed circuit board constituting the transmit and receive coils of a metal detector head according to an alternate disclosed embodiment.
Figure 3B:
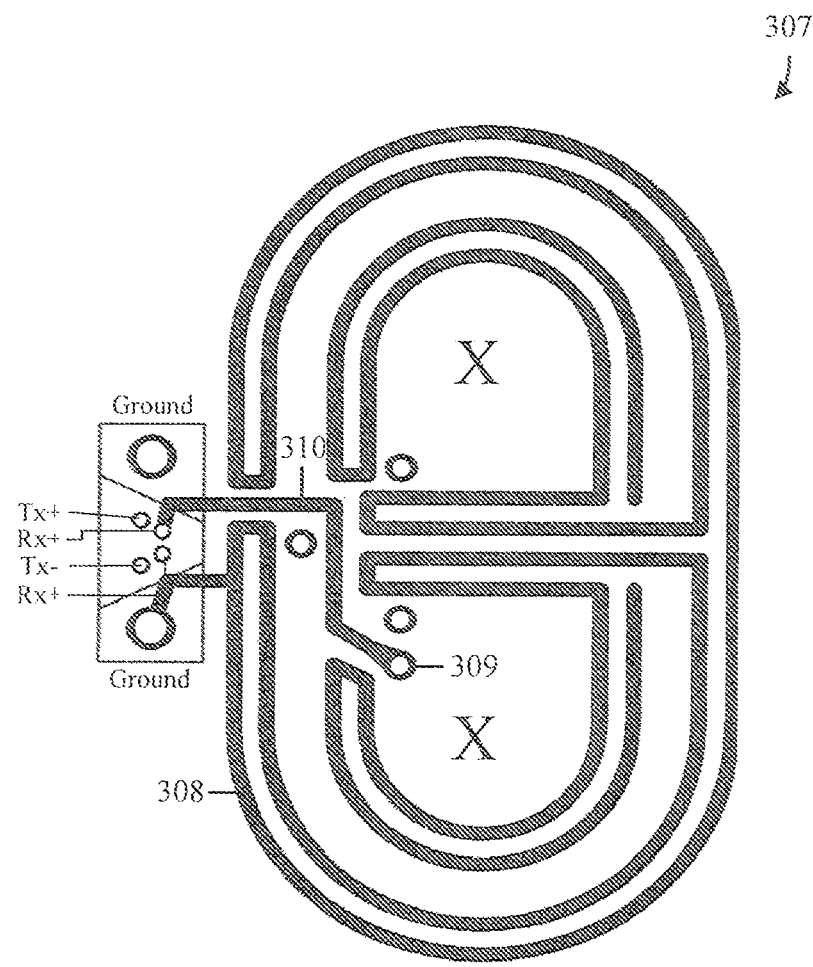
Figure 3C:
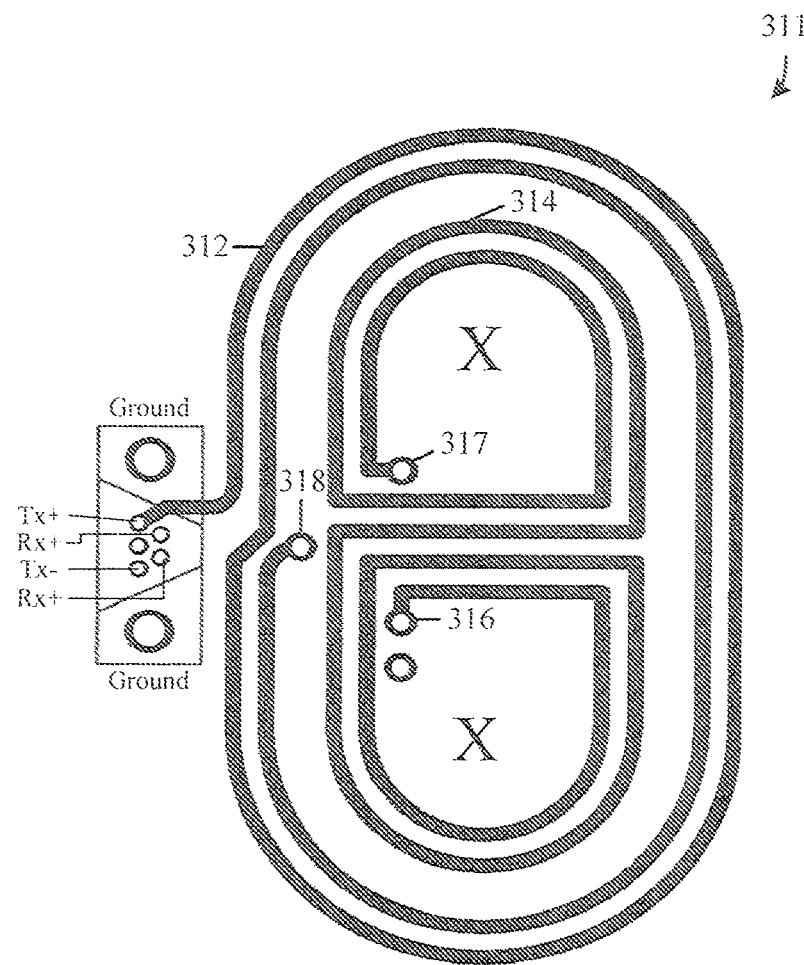
Figure 3D:
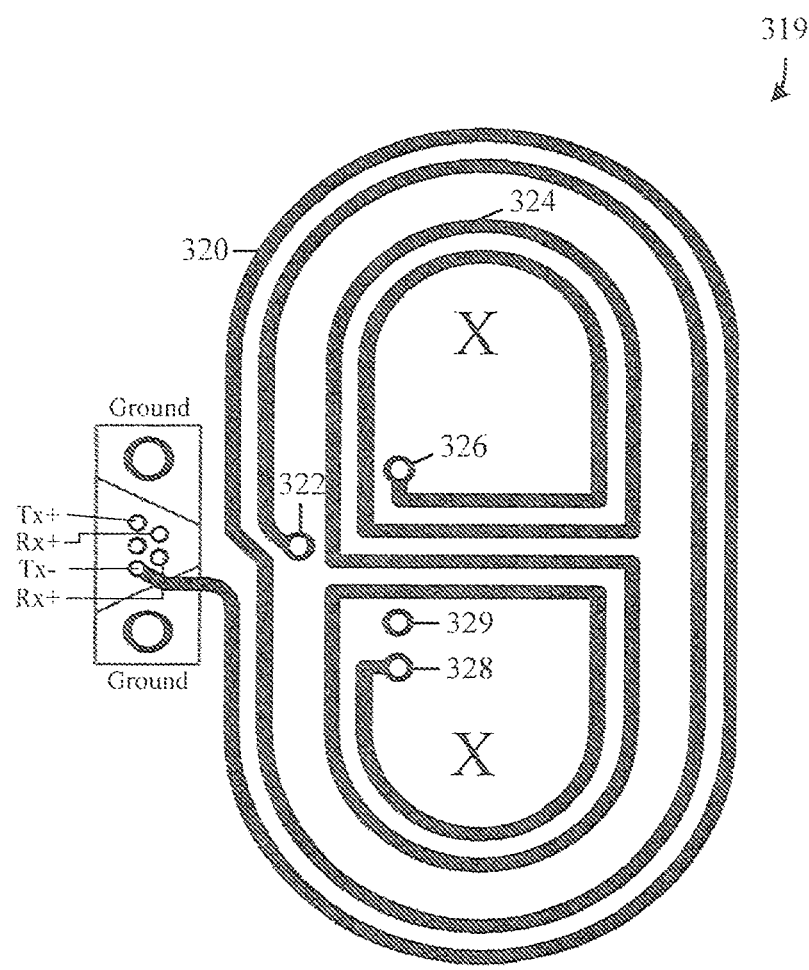

FIGS. 3A-D illustrate various layers of the PCB. FIG. 3A illustrates a top grounding (shielding) layer 301 with four grounding fingers formed by a long trace 302 connected to the ground terminal that covers the inner and outer areas of the PCB, and a short trace 304 connected to the Rx− (receive coil negative) terminal and the through hole via 306. FIG. 3B illustrates a bottom grounding layer 307 with four grounding fingers formed by the long trace 308, and a short trace 310 connected to the Rx+ (receive coil positive) terminal. Each PCB will have one top grounding layer 301 and one bottom grounding layer 307, with one or more pairs of complementary inner layers disposed between them. FIGS. 3C and 3D illustrate the complementary first and second inner layer PCBs, respectively. The first inner layer 311 illustrated in FIG. 3C includes an outer trace 312 that forms two turns of a transmit coil, and an inner trace 314 that forms two turns of a quadrupole receive coil. The via 316 in FIG. 3C is aligned with the via 306 in the top grounding layer 301 of FIG. 3A, so the trace 314 will be electrically connected to the Rx− terminal at this point.

The second inner layer 319 illustrated in FIG. 3D also includes an outer trace 320 that forms two turns of the transmit coil, with one end of the trace connected to the Tx− terminal and the other end connected to via 322 which is aligned with via 318 of FIG. 3C, thereby connecting the two turns of the transmit coil realized by the trace 320 in FIG. 3D to the two turns of the transmit coil realized by the trace 312 of FIG. 3C. The second inner layer of FIG. 3D also includes an inner trace 324 that forms two turns of the receive coil in a quadrupole configuration. One end of the trace 324 is connected to via 326, which aligns with via 317 of FIG. 3C, thereby connecting the two turns of the receive coil formed by the trace 324 with the two turns of the receive coil formed by the trace 314 of FIG. 3C. The other end of the trace 324 is connected to via 328, which aligns with via 309 of the bottom grounding layer 307 of FIG. 3B, thereby connecting the two turns of the receive coil formed by trace 324 with the Rx+ terminal shown in FIG. 3B.

A four layer PCB formed by a top layer 301, a first inner layer 311, a second inner layer 319 and a bottom layer 307, along with suitable interconnections made using the vias discussed above, will thus have receive and transmit coils with four turns (two turns on each of the inner layers When additional turns on the transmit and receive coils are desired, additional inner PCB layers may be added. FIGS. 4A-F illustrate an exemplary multilayer PCB with internal layers between a top layer and a bottom layer. In order to accommodate the interconnection between the layers, additional vias are added. In general, 2 additional vias for the transmit coil and two additional vias for the receive coil are needed for each pair of additional inner layers. As with the previously discussed 4-layer embodiment, the six-layer PCB includes a top grounding layer 401 shown in FIG. 4A with a long, four finger grounding trace 402 and a short trace 404 connected to an Rx− terminal via and a second via F. Below the top layer 401 is an inner layer 411 shown in FIG. 4B. The inner layer 411 includes an outer trace 412 that forms two turns of the transmit coil, and an inner trace 414 that forms two turns of the receive coil, again in a quadrupole configuration. The outer transmit coil trace 412 is connected on one end to a Tx− terminal via and at the other end to a via C. The receive coil turns 414 are connected at one end to a via F (through which it is connected to the Rx− terminal connection in layer 401) and to a via D on the other end.

Figure 4A:
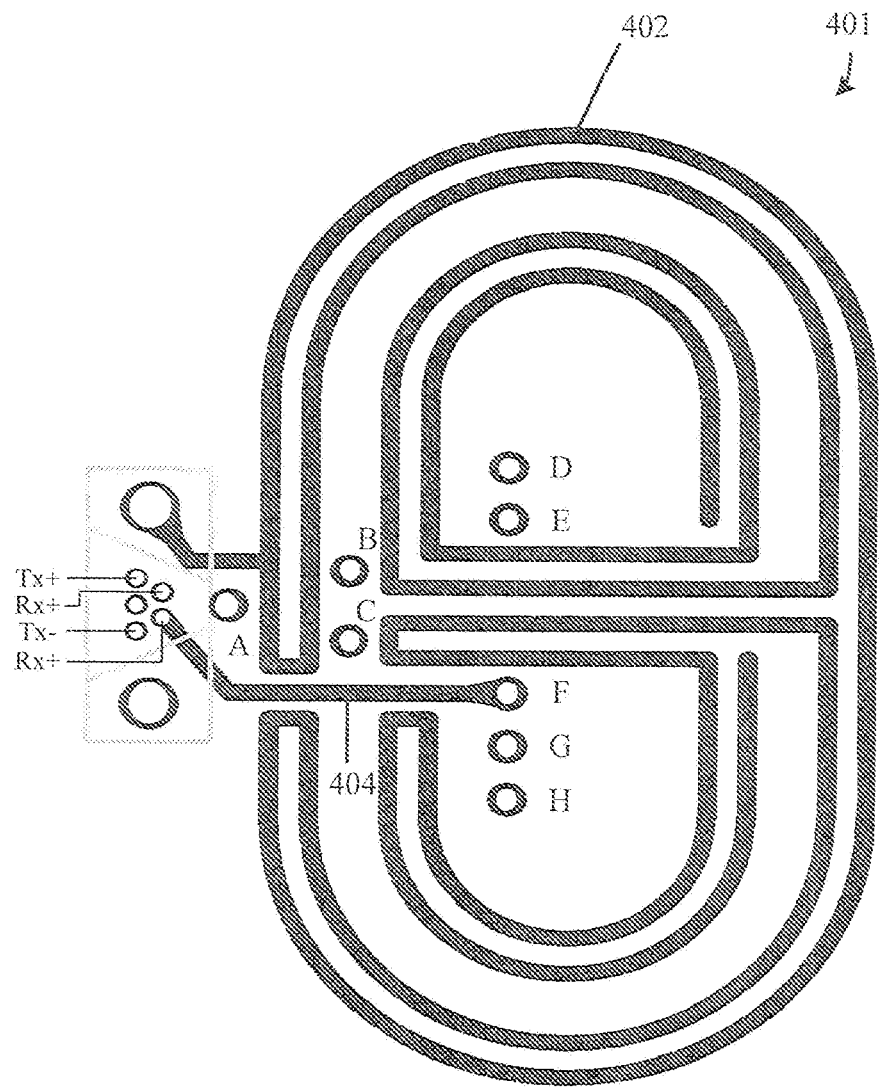
FIGS. 4A-4F are schematic representations of layers in a multi-layer printed circuit board constituting the transmit and receive coils of a metal detector head according to an alternate disclosed embodiment.
Figure 4B:
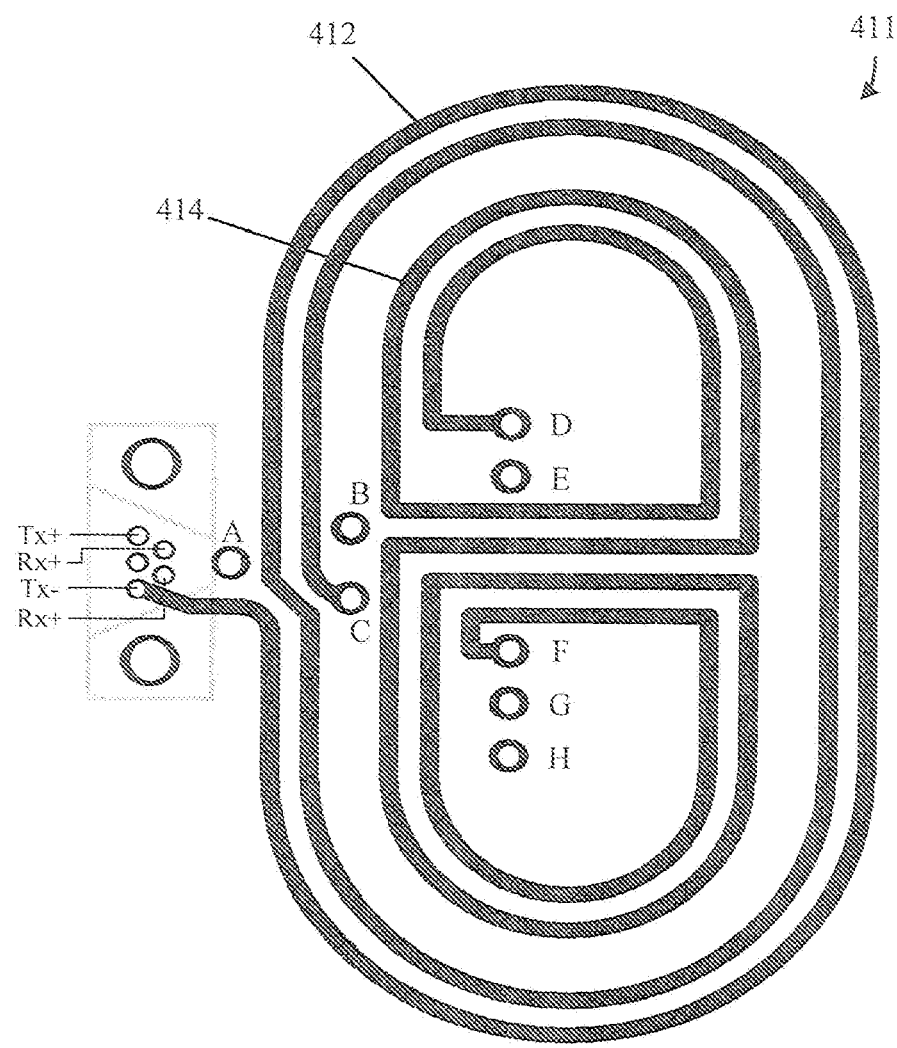
Figure 4C:
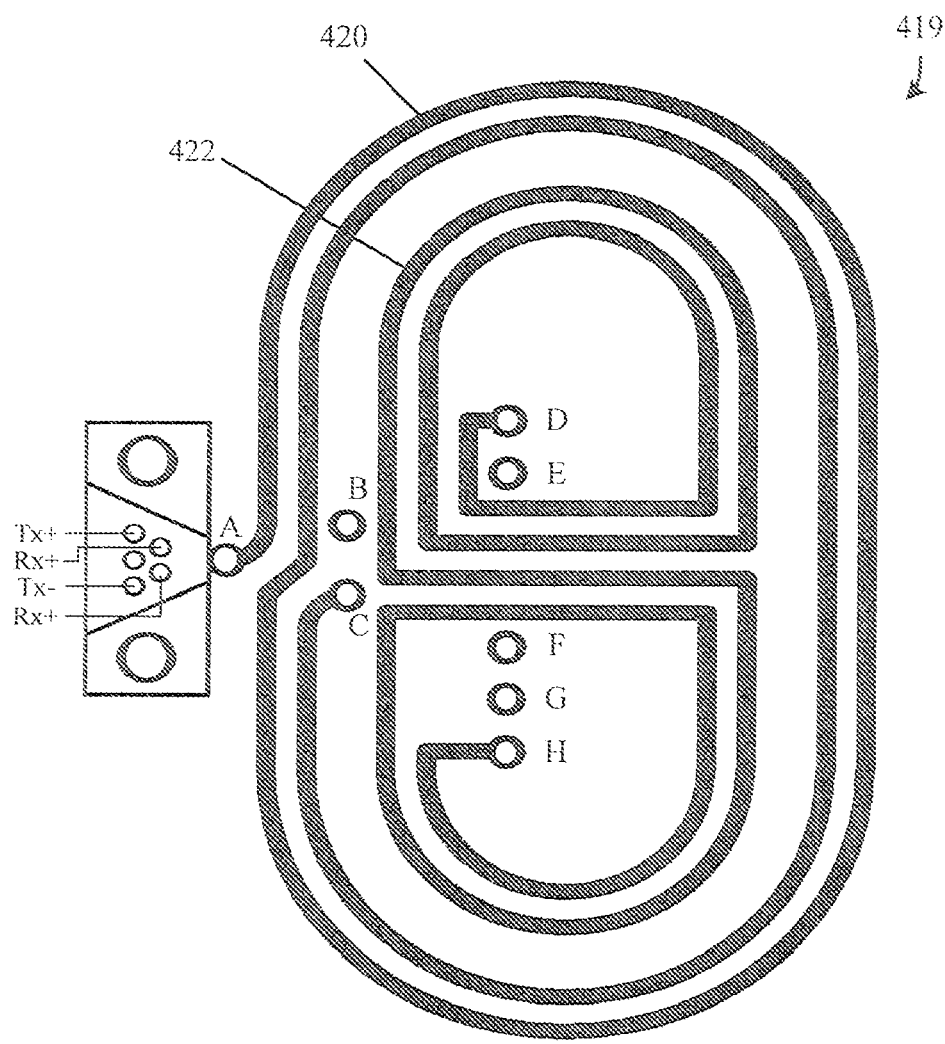
Figure 4D:
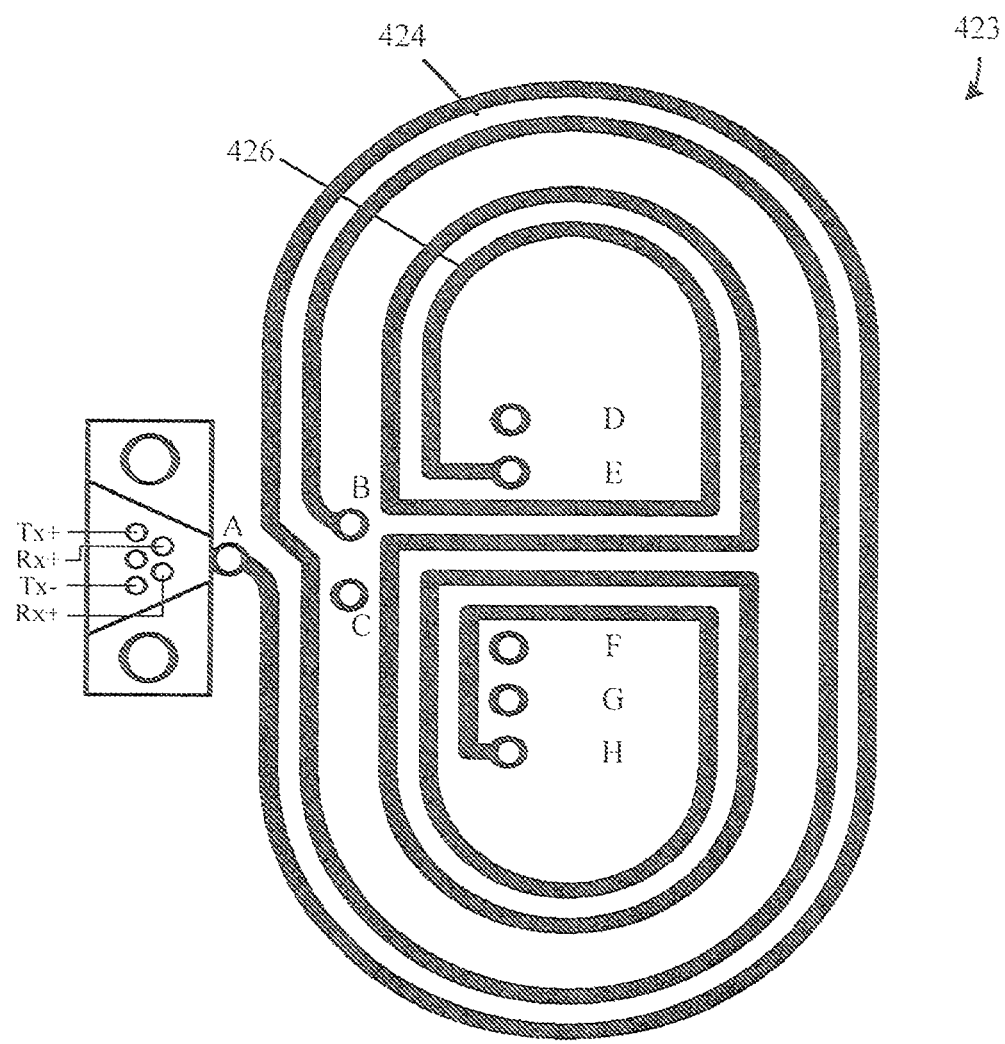
Figure 4E:
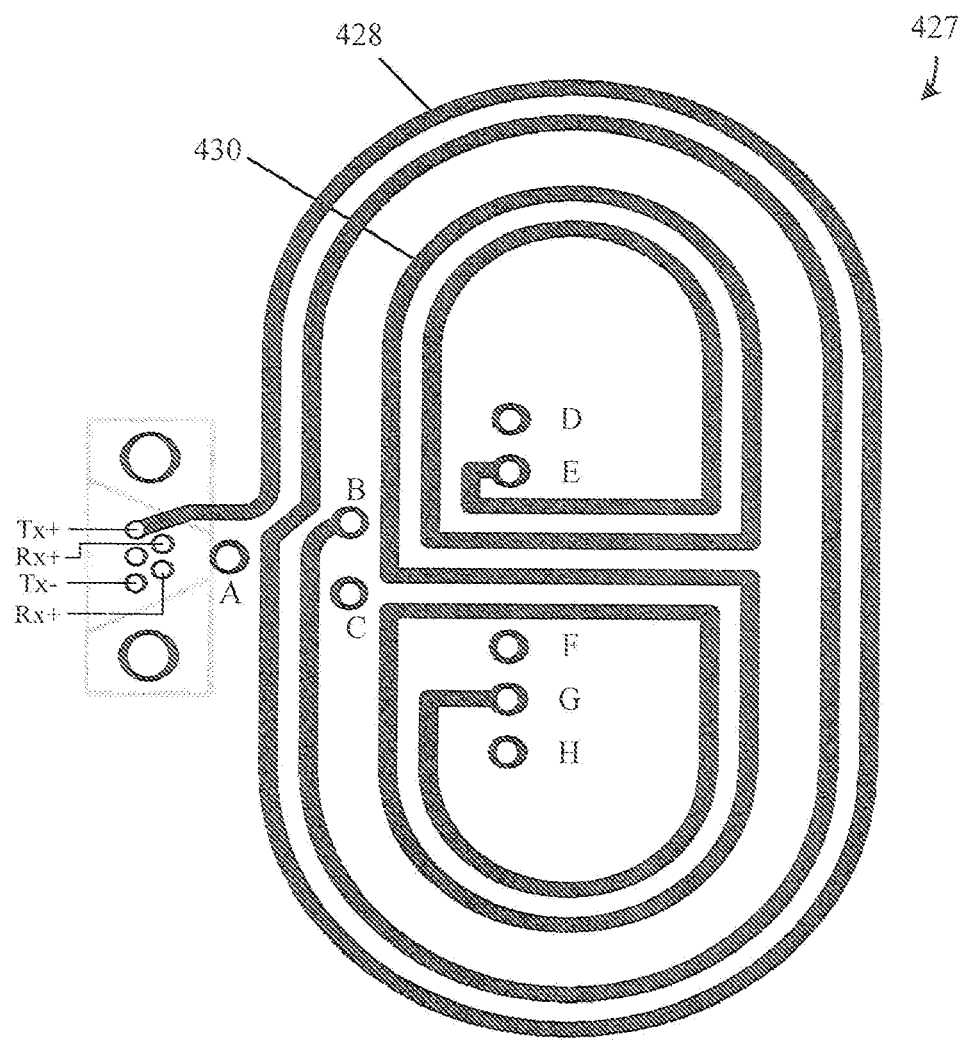
Figure 4F:
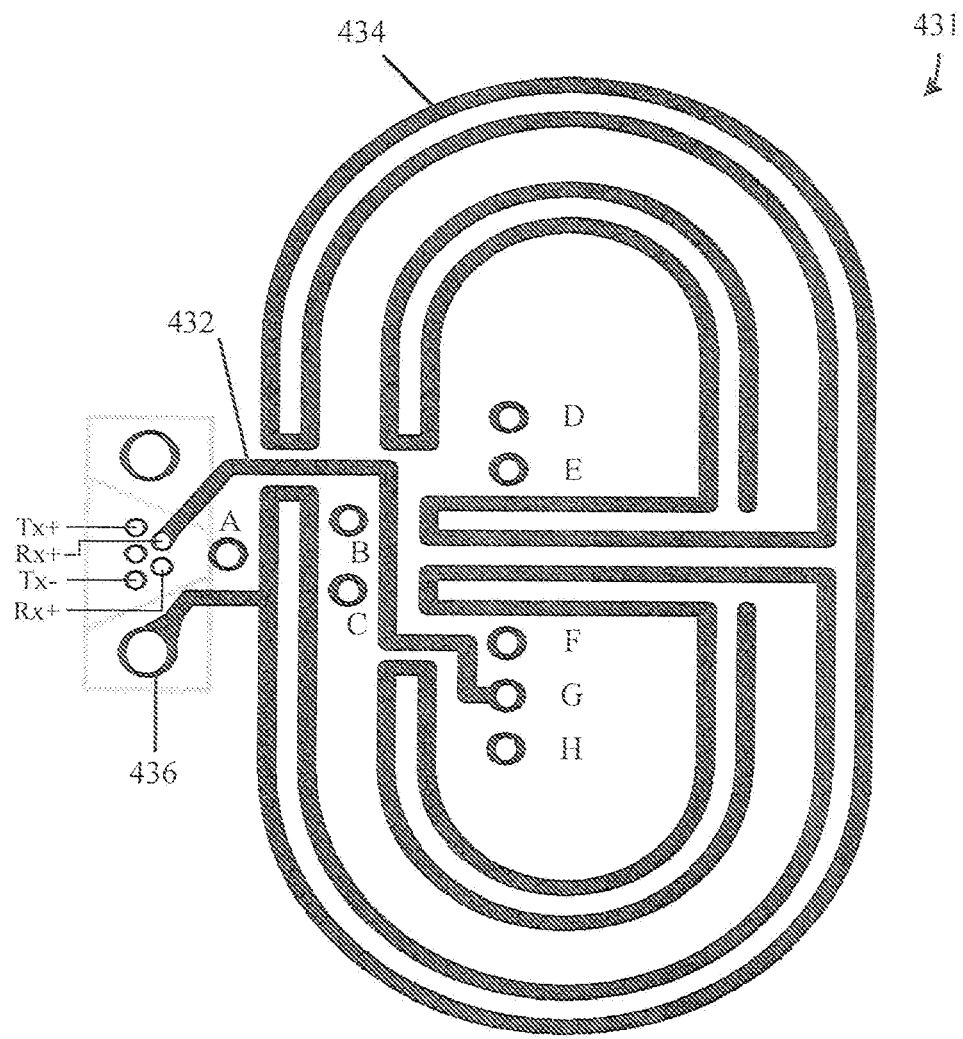

The next layer 419, shown in FIG. 4C, includes two turns 420 of the transmit coil connected to a via C (through which they are connected to the transmit coil turns in layer 411) and a via A, and two turns 422 of the receive coil connected to a via D (through which it is connected to the receive coil turns in layer 411) and a via H. The next layer 423, shown in FIG. 4D, includes two turns 424 of the transmit coil connected to a via A (through which they are connected to the transmit coil turns in layer 419) and a via B, and two turns 426 of the receive coil connected to a via H (through which it is connected to the receive coil turns in layer 419) and a via E. The next layer 427, shown in FIG. 4E, includes two turns 428 of the transmit coil connected to a via B (through which they are connected to the transmit coil turns in layer 423) and a Tx+ via, and two turns 430 of the receive coil connected to a via E (through which it is connected to the receive coil turns in layer 423) and a via G. The bottom layer 431 shown in FIG. 4F includes a trace 432 connected at one end to a via G (through which it is connected to the receive coil turns in layer 427) and at the other end to a Rx+ terminal. The bottom layer 431 also includes a long trace 434 connected to a via 436 that forms four grounding fingers. Those of skill will recognize that additional pairs of inner layers may be added by adding additional vias for the transmit and receive coils using the scheme of FIGS. 4A-F.

Referring now back to FIGS. 3A-D, in order to facilitate incorporation of V-dipole antennas (as discussed further below), the areas of the PCB marked with an X in FIGS. 3A-D inside each of the figure-8 patterns of the receive coil may be removed to allow the distal ends of the V-dipole antennas to be placed through the plane of the PCB. In other embodiments in which the ends of the V-dipole antennas are not passed through the plane of the PCB, those areas in FIGS. 3A-D marked with an X are not removed.

The layers 301, 307, and one pair of complementary layers 311 and 319 illustrated in FIGS. 3A-D may be formed into a single PCB 510 (with the areas of the PCB 510 marked with an X in FIGS. 3A-D removed) that forms a part of a hybrid MD/GPR head 500 as shown in FIGS. 5A-C. Also forming part of the hybrid head 500 are four planar V-dipole antenna elements 520. As shown most clearly in FIG. 5B, the legs 522 of each of the antenna elements 520 extend through the central plane (the plane parallel to the faces of the PCB 510 and passing through its center) P of the PCB 510 such that the distal ends of the legs 522 and the vertex V of the elements 520 are on opposite sides of the plane of the PCB 510. Referring still to FIG. 5B, the central plane P of the PCB 510 forms an angle y of 70 degrees with respect to the central axis Y of the V-dipole antenna elements 520 (the central axis of the V-dipole antenna elements is the axis that passes through the vertex of the V-dipole antenna element and is equidistant from and coplanar with the axes of the two legs of the V-dipole antenna element) and an angle x of 20 degrees with respect to the plane X that is perpendicular to the central axis Y. Although an angle y of 70 degrees is illustrated in FIG. 5B, the angle y may range from 20 to 90 degrees (i.e., the angle x may range from 0 to 70 degrees) in other embodiments. Further, although the legs 522 of the V-dipole elements 520 extend through the plane P in the embodiment of FIG. 5, in other embodiments the entirety of the V-dipole elements 520 are on one side of the plane P while remaining inside an imaginary cylinder C having a cross sectional shape formed by the projection of an outer perimeter of the coils of the PCB 510 on the plane X normal to the central axis of the V-dipole elements 520.

Positioning the PCB 510 at a non-normal angle with respect to the V-dipole antenna elements 520 reduces antenna coupling by creating a time lag between received impulses in each of the V-dipole antenna legs 522. Since the coupling at each leg and the nearest portions of the PCB 510 are of different length scales, the differential signal between the two is incoherent. The resulting coupling is incoherent and displays little ringing in the received GPR signal. Coupling between the portions of the coils on the PCB 510 that are perpendicular to the legs 522 of the V-dipole elements 520 (e.g., the crossbar 512) is minimized because of the perpendicular relationship.

Referring now to FIG. 5A, it can be seen that the V-dipole elements 520 are on one side of the crossbar 512 (i.e., the elements 420 are on one side of a plane that passes through a center of the crossbar 512, is perpendicular to the faces of the PCB, and is parallel to an axis of the crossbar 512 in a direction in which current flows in the crossbar 512). This is done in order to minimize coupling between the V-dipole elements 520 and the terminals (not shown in FIG. 4) of the PCB 510. In other embodiments, V-dipole elements 520 are positioned such that their legs 522 are on opposite sides of the crossbar 512.

Figure 6:
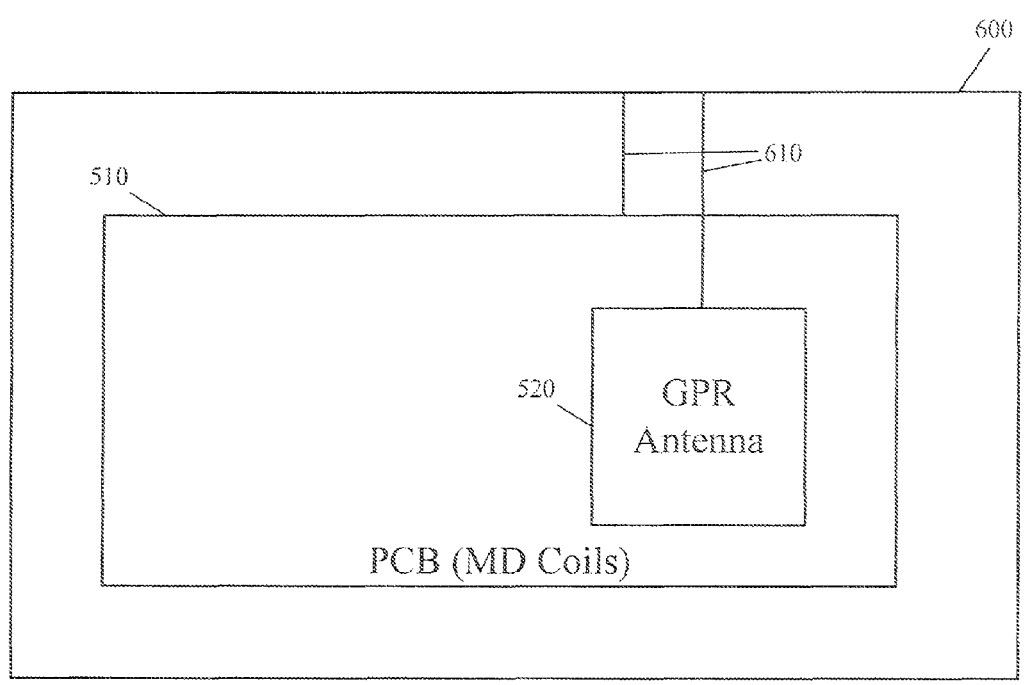
FIG. 6 is a block diagram of a hybrid head including a printed circuit board implementation of transmit and receive coils and a ground penetrating radar antenna mechanically connected to a housing according to an alternate disclosed embodiment.

The MD/GPR hybrid heads disclosed herein may be utilized in any device, and in particular may be incorporated into a handheld device that includes the hybrid head and other conventional components such as signal generators to generate signals for transmission by the MD transmit coil and the GPR antenna, a signal processor and associated analog-digital converters to process signals received by the MD receive coil and the GPR antenna, a power supply, and appropriate interconnections between the aforementioned components. Any conventional techniques known in the art may be utilized to process such received signals. The handheld device may further incorporate a display for displaying video from the GPR and objects detected by the MD. When the hybrid head is incorporated into such a handheld device, it may be wholly or partially enclosed by a housing such as the housing 600 of FIG. 6. Regardless of whether or not a housing is provided, the GPR antenna elements and the transmit and receive coils of the hybrid head will be mechanically connected, either directly to each other or to another component and/or the housing (e.g., the mechanical connections 610 of FIG. 6).

It will be apparent to those of skill in the art that numerous variations in addition to those discussed above are also possible. Therefore, while the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

The invention claimed is:
1. A ground penetrating radar ("GPR") and metal detector ("MD") hybrid head comprising:

an MD sensor including at least one receive coil in a quadrupole configuration including a crossbar, and at least one transmit coil, the crossbar having a first axis parallel to a direction in which current flows in the crossbar; and at least one GPR V-dipole antenna arranged in a plane perpendicular to the first axis of the crossbar so as to reduce coupling between the coils of the MD sensor and the antenna;

wherein the transmit coil has an outer perimeter, the receive coil has an outer perimeter, and wherein at least a portion of the V-dipole antenna is within a cylinder formed by the projection of one of the outer perimeter of the receive coil or the transmit coil onto a plane perpendicular to a central axis of the V-dipole antenna.

2. The hybrid head of claim 1, further including at least one electrostatic shield covering the top and bottom portion of the transmit and receive coils so as to stabilize capacitance between the transmit and receive coils and the changing external environment.

3. The hybrid head of claim 1, wherein the at least one receive coil is concentric with the at least one transmit coil.

4. The hybrid head of claim 3, wherein each of the at least one transmit coil and the at least one receive coil includes a plurality of turns respectively, the plurality of turns being concentric to each other and offset along an axis of concentricity.

5. The hybrid head of claim 3, wherein the at least one V-dipole antenna is located within one half of the MD sensor on one side of the crossbar.

6. The hybrid head of claim 3, where first and second conductors of the at least one V-dipole antenna are placed on opposite sides of the crossbar.

7. The hybrid head of claim 3, wherein the MD coils are pitched at an angle between 20 and 90 degrees with respect to a central axis of the V-dipole antenna.

8. The hybrid head of claim 1, wherein the at least one transmit coil and the at least one receive coil are formed on a printed circuit board ("PCB").

9. The hybrid head of claim 8, wherein the PCB has at least one layer including at least one turn of the transmit coil and at least one turn of the receive coil.

10. The hybrid head of claim 8, wherein the PCB includes multiple layers, each of the layers including at least one turn of the transmit coil and at least one turn of the receive coil, wherein the at least one turn of the transmit coil and the at least one turn of the receive coil are approximately concentric and wherein the concentric layers which are arranged in stacked planes which are offset from each other along an axis of concentricity.

11. The hybrid head of claim 8, wherein the at least one V-dipole antenna is located within one half of the MD receive coil on one side of the crossbar.

12. The hybrid head of claim 8, where first and second conductors of the at least one V-dipole antenna are placed on opposite sides of the crossbar.

13. The hybrid head of claim 8, wherein the MD coils are pitched at an angle between 20 and 90 degrees with respect to a central axis of the V-dipole antenna.

14. The hybrid head of claim 1, further comprising a housing, wherein the MD sensor and the GPR antenna are mechanically connected to the housing.

15. A method for manufacturing an MD/GPR hybrid head, the method comprising the steps of:

forming an MD sensor including at least one receive coil in a quadrupole configuration including a crossbar, and at least one transmit coil, the crossbar having a first axis parallel to a direction in which current flows in the crossbar; and positioning at least one GPR V-dipole antenna in a plane perpendicular to the first axis of the crossbar so as to reduce coupling between the coils of the MD sensor and the antenna;

wherein the transmit coil has an outer perimeter, the receive coil has an outer perimeter, and wherein at least a portion of the V-dipole antenna positioned within a cylinder formed by the projection of one of the outer perimeter of the receive coil or the transmit coil onto a plane perpendicular to a central axis of the V-dipole antenna.

16. The method of claim 15, further including the step of covering the top and bottom portion of the transmit and receive coils with at least one electrostatic shield so as to stabilize capacitance between the transmit and receive coils and the changing external environment.

17. The method of claim 15, wherein the at least one receive coil is concentric with the at least one transmit coil.

18. The method of claim 15, wherein the at least one V-dipole antenna is positioned within one half of the MD sensor on one side of the crossbar.

* * * * *